United States Patent
Bouvet et al.

(10) Patent No.: US 11,171,828 B2
(45) Date of Patent: Nov. 9, 2021

(54) METHOD FOR CONFIGURING A TERMINAL

(71) Applicant: ORANGE, Issy-les-Moulineaux (FR)

(72) Inventors: Bertrand Bouvet, Chatillon (FR); Stephane Boizard, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/622,664

(22) PCT Filed: Jun. 12, 2018

(86) PCT No.: PCT/FR2018/051378
§ 371 (c)(1),
(2) Date: Dec. 13, 2019

(87) PCT Pub. No.: WO2018/229425
PCT Pub. Date: Dec. 20, 2018

(65) Prior Publication Data
US 2020/0119984 A1    Apr. 16, 2020

(30) Foreign Application Priority Data
Jun. 14, 2017 (FR) .................................. 1755367

(51) Int. Cl.
*H04L 12/24*   (2006.01)
*H04L 29/06*   (2006.01)
*H04W 48/16*   (2009.01)

(52) U.S. Cl.
CPC ...... *H04L 41/0806* (2013.01); *H04L 65/1006* (2013.01); *H04L 65/1016* (2013.01); *H04L 65/1073* (2013.01); *H04W 48/16* (2013.01)

(58) Field of Classification Search
CPC ............... H04L 65/104; H04L 65/1016; H04L 65/1069; H04L 65/1073; H04L 65/1006;
(Continued)

(56) References Cited

U.S. PATENT DOCUMENTS

2007/0171841 A1    7/2007  Witzel et al.
2009/0129388 A1    5/2009  Akhtar et al.
(Continued)

OTHER PUBLICATIONS

English translation of the Written Opinion of the International Searching Authority dated Oct. 23, 2018 for corresponding International Application No. PCT/FR2018/051378, filed Jun. 12, 2018.
(Continued)

*Primary Examiner* — Michael Thier
*Assistant Examiner* — Prince A Mensah
(74) *Attorney, Agent, or Firm* — David D. Brush; Westman, Champlin & Koehler, P.A.

(57) ABSTRACT

A method is proposed for configuring a terminal by using a server in an IMS communication network. The method includes: receiving an SIP registration message from a terminal, the registration message having at least one parameter relating to the access network, obtaining a configuration from the parameter relating to the access network included in the registration message received, and transmitting to the terminal a response to the registration message, the message having the configuration obtained from the parameter relating to the access network. Correlatively, a method is proposed for obtaining a configuration on a terminal.

20 Claims, 4 Drawing Sheets

(58) Field of Classification Search
CPC ..... H04W 48/00; H04W 48/16; H04W 48/18; H04W 48/20
See application file for complete search history.

(56) References Cited

U.S. PATENT DOCUMENTS

| | | | | |
|---|---|---|---|---|
| 2011/0116495 | A1* | 5/2011 | Purkayastha | H04L 65/104 370/352 |
| 2012/0303831 | A1* | 11/2012 | Toshniwal | H04L 65/1069 709/229 |
| 2013/0337804 | A1 | 12/2013 | Boulos | |
| 2014/0376511 | A1* | 12/2014 | Kalapatapu | H04L 65/1016 370/331 |
| 2015/0063227 | A1* | 3/2015 | Chaponniere | H04M 7/0057 370/329 |
| 2016/0021146 | A1* | 1/2016 | Mufti | H04L 65/1073 370/328 |
| 2016/0338009 | A1* | 11/2016 | Yang | H04W 68/005 |
| 2018/0063688 | A1* | 3/2018 | Lindholm | H04L 65/1016 |

OTHER PUBLICATIONS

International Search Report dated Oct. 11, 2018 for corresponding International Application No. PCT/FR2018/051378, filed Jun. 12, 2018.
Written Opinion of the International Searching Authority dated Oct. 11, 2018 for corresponding International Application No. PCT/FR2018/051378, filed Jun. 12, 2018.
Garcia-Martin Ericsson E Henrikson Lucent D Mills Vodafone M: "Private Header (P-Header) Extensions to the Session Initiation Protocol (SIP) for the 3rd-Generation Partnership Project (3GPP); rfc3455.txt", Private Header (P-HEADERo Extensions to the Session Initiation Protocol (SIP) for the 3rd-Generation Partnership Project (3GPP)?; RFC3455.TXT, Internet Engineering Task Force, IETF; Standard, Internet Society (ISOC) 4, Rue Des Falaises CH-1205 Genev, Jan. 1, 2003.

* cited by examiner

METHOD FOR CONFIGURING A TERMINAL

CROSS-REFERENCE TO RELATED APPLICATIONS

This application is a Section 371 National Stage Application of International Application No. PCT/FR2018/051378, filed Jun. 12, 2018, the content of which is incorporated herein by reference in its entirety, and published as WO 2018/229425 on Dec. 20, 2018, not in English.

FIELD OF THE DISCLOSURE

The present invention lies in the general field of telecommunications.

It relates more particularly to the management of access, via a terminal, to a plurality of networks for accessing a telecommunications network, for example in order to access a telephony or video telephony service on a mobile network.

PRIOR ART

Telephony and video telephony services on 2G and 3G mobile networks use "circuit-switched" technology, called CS (Circuit Switching).

For the last few years, with the advent of 4G mobile networks, operators have begun to deploy IMS (IP Multimedia Subsystem) architectures, making it possible to provide their clients with VoLTE/ViLTE (VxLTE) services, that is to say voice, video telephony and SMSoIP (Short Message Service over IP) services using IP technology.

Moreover, in order to cover lacks of 2G, 3G or 4G cellular radio coverage, typically in black spots or in an indoor situation, operators have decided to offer their clients VoWiFi/ViWiFi (VxWiFi) services, with what is known as the "S2b" mode, that is to say untrusted Wi-Fi access (not managed by the operator). One advantage of these VxWiFi services is that they may be available on any Wi-Fi access point, whether or not the access point is managed by the telecommunications operator, unlike what is known as the "S2a" VxWiFi mode, which operates only from Wi-Fi access points managed by the operator.

VxLTE and VxWiFi services both use "packet-switched" technology, called PS, and the same IMS core network.

There are therefore at present three different access modes to one and the same mobile network: two modes using packet-switched technology PS (the 4G access network and the Wi-Fi access network), and one mode using circuit-switched technology CS (the 2G/3G access network). A mobile terminal has to be able to adapt to the various constraints of these connection modes.

Secondly, in the case of moving to a visited network (roaming out), some services may not be offered by the operator of the visited network, either because they are not implemented or because the roaming agreements do not provide access to these services.

At present, there is no standard for adapting the behavior of a terminal to the services offered by an access point or a particular network. Compatible terminals currently offered by operators are therefore configured statically in internal software by the terminal suppliers depending on instructions provided by the operators.

Such a solution lacks flexibility, in particular when, following an incident, a service offered by a network is no longer available, or in the event of a change to the services offered by the network. For example, a terminal preconfigured by an operator depending on a certain number of services offered at the time when the terminal is marketed is not able to benefit from the launching of new services without updating its internal software. Now, updating the internal software of the terminals is often controlled by the suppliers of these terminals and not controlled by the network operators, thereby bringing about sometimes significant delays when an operator wishes to modify the behavior of a terminal connecting to its network.

Likewise, a terminal in a roaming situation in a visited network is not able to adapt to the services and/or to the constraints of the visited network, resulting in some services being unavailable in a roaming situation or incorrect operation of the terminal depending on the technical choices that may have been made by the operator of the visited network (incorrect interpretation of an error code for example). Such malfunctions may lead to excessive consumption of resources. Other problems, such as billing problems, may also occur for example when a user is used to his terminal using a Wi-Fi access network for free when it is available, but the operator of a visited network provides a fallback to a cellular network in the same circumstances.

A terminal may be configured so as to stay registered on the IMS network when it switches to 2G/3G access technology. Such behavior may be beneficial for an operator offering IMS services on 2G/3G access, such as for example an SMSoIP service, since it allows the terminal to keep the IP address that has been assigned thereto under 4G coverage, and thus to keep a SIP registration in order to benefit from IMS services on a 2G/3G network. However, keeping such a context is needlessly expensive when no IMS service is available on 2G/3G access technology.

There is therefore a need for a solution for dynamically adapting the behavior of a terminal according to a network context at a low cost.

SUMMARY

To this end, what is proposed is a method for configuring a terminal via a server in an IMS communication network.

The method is noteworthy in that it comprises the following steps, implemented by a server of the IMS network:
  receiving a SIP registration message from a terminal, the registration message comprising at least one parameter relating to an access network used by the terminal,
  obtaining a configuration from the parameter relating to the access network contained in the received registration message,
  transmitting a response to the registration message to the terminal, the message comprising the configuration obtained from the parameter relating to the access network.

A configuration adapted to the context in which a terminal connects to the network is transmitted at the time of its registration on the network. The terminal thus always has an appropriate configuration as soon as it is registered on a communication network. For this purpose, the registration message initially transmitted by the terminal comprises one or more parameters relating to the access network that is used. This may be for example an identifier of a country or of a visited network. This parameter is filled in by the terminal itself or by an intermediate network equipment on the network path taken by the message, such as for example a P-CSCF server. When the parameter is filled in by an intermediate equipment, the validity thereof is able to be certified. Upon receiving such a message, the server obtains a configuration adapted to the conditions in which the terminal accesses the communication network, by interrogating for example a database in which associations between parameters relating to the access network and particular configurations are stored. The configuration thus obtained is transmitted to the terminal in the response to the registration message transmitted by the terminal.

The method thus allows automatic configuration of the terminal depending on the context in which it accesses the services of an IMS network. The configuration of the terminals may be modified without updating internal software of the terminal or a SIM card.

According to one particular embodiment of the configuration method, the configuration that is obtained and transmitted to the terminal comprises at least one parameter relating to a type of coding of multimedia flows that is accepted by the communication network.

Information regarding the various coding able to be used on the communication network is transmitted to the terminal when it registers, in the response message to the registration message, for example in the form of an XML description contained in the body of a 200 OK response message to a SIP registration message or event subscription message. Such information is for example one or more codecs (for coder-decoder) able to be used on the network, a framing period of the RTP packets or any other configuration parameter relating to the coding of media implemented in communications set up through the network. The network is thus able to prohibit the use of certain codecs or to impose a maximum number of samples per transmitted packet. Such parameters are conventionally provided by the network when communication is set up. For example, a terminal proposes a list of codecs that it has in order to code the flows of a communication, and the network provides a subset of compatible codecs in return. This method exhibits the drawback of needlessly increasing the size of the call setup messages when some codecs proposed by the terminal are not supported by the network. A terminal according to the invention knows, as soon as it registers, the codecs and the parameters that relate thereto that are supported by the network. The method thus makes it possible to avoid codecs that are not supported being proposed by the terminal, thereby making it possible to optimize the amount of data transmitted in order to set up communication. The call setup time is able to be sped up and the bandwidth is optimized.

According to one particular embodiment, the method is such that the configuration comprises at least one criterion for selecting a particular access technology in order to set up communications.

A smartphone mobile terminal is able to access an IMS communication network using various access technologies. For example, a mobile terminal is able to connect to an IMS network via a 4G cellular access network in accordance with the VxLTE standard. Such a standard makes it possible to set up audio or video communications in packet-switched mode using the IP (Internet Protocol) protocol. This same mobile terminal is also able to connect to the IMS network by way of a Wi-Fi access point using a VxWi-Fi protocol in order to set up communications in packet-switched mode. The terminal is furthermore able to set up communications in circuit-switched mode through a 2G or 3G cellular network.

The configuration method, when the terminal registers, makes it possible to provide criteria for selecting a preferred network for performing communications or exchanging SMS messages, one or more fallback strategies to an access network of a second type in the event of failure to set up communication on an access network of a first type or a loss of connection, a strategy to keep the bearer when changing from a first access technology to a second access technology. For example, the configuration may define a second type of access network to be used when setup of a communication fails with a particular error code.

An operator of a communication network is thus able to force the terminals registering on its network to observe certain expected behavior in the event of an error or when particular conditions linked to the service logic of the operator impose this.

According to one particular embodiment of the configuration method, the configuration that is obtained and transmitted to the terminal in the response to the SIP registration message comprises at least one strategy for managing emergency calls.

An operator is thereby able to tell a terminal that emergency calls have to be made using a particular access technology. For example, an operator may tell the terminal registering on its network that emergency calls have to be made using circuit-switched technology, for example 2G or 3G. Such a provision makes it possible for example to avoid emergency calls being made using access technology that the operator does not know how to process, for example using VoLTE due to the specific protocol procedures to be implemented, or else does not know how to provide a certified location of the calling terminal, for example using VoWiFi.

According to one particular embodiment of the configuration method, the configuration comprises at least one strategy for configuring the SIP protocol stack of the terminal.

For example, on a fixed access network, the configuration transmitted in the response to the SIP registration message may define first SIP configuration parameters (telephony with codec G711/G729/G722+DTMF in accordance with RFC 4733+echo canceling activated+gain control activated+dynamic jitter buffer size+voice activity detection activated) for conventional telephony and second configuration parameters (only the codec G711, DTMF in the band+voice activity detection deactivated+echo canceling deactivated+gain control deactivated+fixed jitter buffer size) to be applied for certain types of communication, such as fax or modem communications for example. It is thus possible for an operator network to precisely configure the behavior of the terminals that register in order to set up communications through its network and to offer optimized configurations depending on the usage context or on the service subscription type of the user of the terminal.

For example, on a mobile access network, the configuration transmitted in the response to the SIP registration message may define modes for configuring the SIP preconditions, for example by taking into account a particular version of the specifications defined by the standardization bodies such as the 3GPP, the GSMA, etc.

Generally speaking, the configuration transmitted to the terminal may comprise any type of parameter and rule for adapting the behavior of the terminal to the services offered by the network or to the constraints imposed by an access technology, business logic specific to the operator, service logic, technological changes, or logic for taking into account changes made by the standardization bodies.

According to one particular embodiment, the configuration method is such that it is implemented on a server chosen from among the servers from the set consisting of:
  P-CSCF (Proxy Call State Call Control),
  I-CSCF (Interrogating Call State Control Function),
  S-CSCF (Session Call State Control Function),
  A-SBC (Access Session Border Controller),
  AS (Application Server), or
  HSS (Home Service Subscriber).

An S-CSCF server is responsible for registration in the IMS network. It is thus well placed to obtain and transmit a configuration in a response to a registration message transmitted by a terminal.

The SIP REGISTER registration messages and their responses transit via the I-CSCF and P-CSCF servers. They are also often collocated with the S-CSCF. These servers are therefore suitable for providing a configuration to the terminal. In addition, the I-CSCF interrogates the HSS server and is thus easily able to obtain configuration data specific to the user or to the services subscribed to by the terminal from the HSS server.

For the case of "roaming out", that is to say when the terminal is roaming in a network of a visited country using the LBO (Local Break Out) model, the I-CSCF and S-CSCF are located in the home country, while the P-CSCF (or A-SBC) is located in the visited country. The configuration of the terminal that is provided by the P-CSCF is therefore able to be controlled entirely by the operator of the visited network, without roaming agreements defining the configuration of the terminals to be provided if this configuration of the terminals is provided by one of the equipments present in the home network (S-CSCF, I-CSCF, AS).

In the case of roaming using the S8HR (S8 Home Routed) model, all of the P-CSCF (or A-SBC), I-CSCF, S-CSCF, AS equipments are located in the home network. In this case, the roaming agreements have to provide the configuration parameters to be provided to the terminals, this involving more advanced and complex processes to be put in place.

The SIP "Third-party Registration" mechanism allows an application server (AS) to see the registration messages and the responses thereto transit. Such a server is therefore also well placed to provide a configuration to the terminal.

Lastly, an A-SBC server is able to see the registration messages and the responses thereto transit when it is placed upstream of the P-CSCF or as a replacement for the P-CSCF.

According to one particular embodiment, the configuration method is such that the at least one parameter relating to the access network is chosen from the set comprising:
  visited country identifier,
  visited network identifier,
  identifier of an access point,
  an access technology,
  location information, or
  identifier of the terminal.

The received SIP registration message comprises at least one parameter relating to the access network. This parameter or these parameters may be inserted into the registration message by the terminal or by an intermediate equipment, such as a P-CSCF server, for example after interacting with a PCRF (Policy and Charging Rules Function). In the latter case, the inserted information may be certified by the network; it is therefore reliable.

In particular, the message comprises a visited country identifier and/or a visited network identifier. The visited country identifier and/or a visited network identifier are important criteria for defining the behavior of a terminal. They determine for example possible roaming agreements between operators on which the availability of particular services, billing, technical choices imposing a particular response of the terminal in the event of an error, etc. depend.

The configuration returned to the terminal may also depend on an access point identifier, on an access technology, on location information of the terminal or else on an identifier of the terminal. For example, services may or may not be available depending on whether the terminal connects from a particular access point, using a particular access technology or at a particular location. The identifier of the terminal, for example the IMEI (International Mobile Equipment Identifier) or SIP user agent, makes it possible to provide a configuration suitable for a particular terminal when for example several terminals share one and the same public identity, or else when it is known that certain hardware and/or software versions of terminals do not support certain functionalities.

According to another aspect, and corresponding to the configuration method, what is proposed is a method for obtaining a configuration via a terminal in an IMS communication network.

The method for obtaining a configuration is noteworthy in that it comprises the following steps:
  sending a SIP registration message comprising at least one parameter relating to the access network,
  receiving a response to the registration message, the response containing at least one configuration associated with the at least one parameter relating to the access network, and
  configuring the terminal according to the received configuration.

The method for obtaining a configuration may be implemented by a terminal when it connects to an IMS communication network or following roaming. The terminal transmits, to a registration server, one or more parameters relating to the network access used in a registration message, such as for example a SIP REGISTER or SIP SUBSCRIBE message. The server implements the configuration method disclosed above. The terminal receives, in response to this registration message, a response into which the server has inserted a suitable configuration. The terminal is then able to be configured according to the received configuration.

The configuration method and the method for obtaining a configuration thus allow dynamic configuration of the terminal at the time of registration or reregistration on an access network. The configuration parameter or parameters is or are transmitted in the response to the registration message, thereby allowing the terminal always to have a configuration suitable for the access context, as soon as it connects to a communication network or as soon as it switches from a first access network to a second access network. The terminal applies the received configuration until receiving a response to a SIP registration message containing a new configuration to be applied.

In this way, in the event of roaming on a visited network, the configuration of the terminal will be adapted automatically to the constraints and/or to the services of the visited network. Likewise, when the terminal switches from a first access technology to a second access technology, for example when it switches from VoLTE (Voice over Long Term Evolution) access to VoWiFi (Voice over Wi-Fi) access or vice versa, the terminal automatically obtains a configuration adapted to the access technology and/or to the constraints and services linked to the access technology.

According to one particular embodiment of the method for obtaining a configuration, the configuration comprises at least one element chosen from among the set of the following elements:
  a parameter relating to a type of coding of multimedia flows that is accepted by the communication network,
  a criterion for selecting a particular access technology for setting up communications,
  a strategy for managing emergency calls, a strategy for configuring service continuity procedures in the event of roaming, or a strategy for configuring the SIP protocol stack of the terminal.

The elements contained in the configuration obtained by the terminal have advantages that are at least analogous to those described above with reference to the configuration method.

According to another aspect, what is proposed is a server for configuring a terminal in an IMS communication network.

Such a server is noteworthy in that it contains:

a communication module, configured so as to receive a SIP registration message from a terminal, the registration message comprising at least one parameter relating to an access network used by the terminal, a module for accessing a database, designed to obtain a configuration from the parameter relating to the access network contained in the received registration message, the communication module furthermore being designed to transmit a response to the registration message to the terminal, the message comprising the configuration obtained from the parameter relating to the access network.

According to yet another aspect, what is proposed is a device for obtaining a configuration in order to connect the device to an IMS communication network.

Such a device is noteworthy in that it contains:

a communication module configured so as to transmit an initial SIP registration message to a server of the IMS communication network, the message comprising at least one parameter relating to the access network used by the device, the communication module furthermore being configured so as to receive a response to the registration message, the response containing at least one configuration associated with the at least one parameter relating to the access network, and a module for configuring the device according to the configuration received by the communication module.

According to yet another aspect, what is proposed is a terminal comprising a device for obtaining a configuration such as described above.

The invention also relates to a configuration system comprising a configuration server and a configuration terminal such as described above.

In one particular embodiment, the various steps of the configuration method and of the method for obtaining a configuration are determined by computer program instructions.

As a result, the invention also targets a computer program containing instructions for executing the steps of the configuration method and/or instructions for executing the steps of the method for obtaining a configuration when said program is executed by a processor.

Such a program may use any programming language, and be in the form of source code, object code, or of intermediate code between source code and object code, such as in a partially compiled form, or in any other desirable form.

The invention relates lastly to an information medium able to be read by a processor and on which there is recorded a computer program comprising instructions for executing the steps of the configuration method and/or instructions for executing the steps of the method for obtaining a configuration.

The information medium may be any entity or device capable of storing the program. For example, the medium may include a non-transient storage means, such as a ROM, for example a CD-ROM or a microelectronic circuit ROM, or else a magnetic recording means, for example a floppy disk or a hard disk. Moreover, the information medium may be a transmissible medium such as an electrical or optical signal, which may be routed via an electrical or optical cable, by radio or by other means. The program according to the invention may in particular be downloaded from an Internet network. As an alternative, the information medium may be an integrated circuit in which the program is incorporated, the circuit being designed to execute or to be used in the execution of the method in question.

The various aforementioned embodiments or implementation features may be added, independently or in combination with one another, to the steps of the configuration method and/or to the method for obtaining a configuration as defined above.

The terminals, servers, devices and programs have at least advantages analogous to those conferred by the corresponding method.

BRIEF DESCRIPTION OF THE FIGURES

Other features and advantages of the method will become more clearly apparent from reading the following description of one particular embodiment, given by way of simple illustrative and nonlimiting example, and the appended drawings, in which.

DETAILED DESCRIPTION OF EMBODIMENTS

Figure 1:
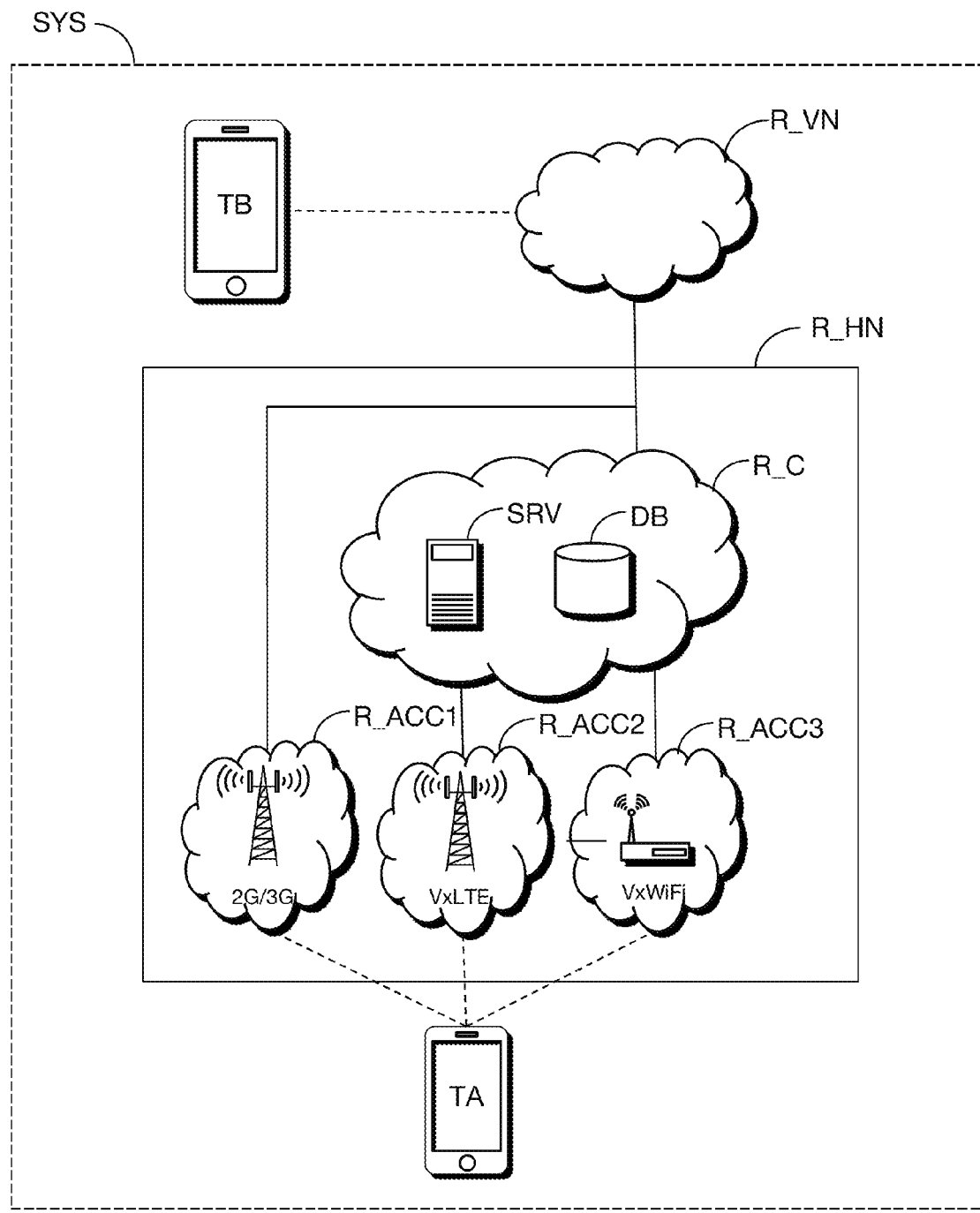
FIG. 1 shows a communication system designed to implement the configuration method and the method for obtaining a configuration.

FIG. 1 shows a system SYS according to the invention.

This system SYS makes it possible to perform a communication session between two equipments in a network and implements a configuration method and a method for obtaining a configuration that are in accordance with one particular embodiment of the invention.

This system SYS contains a terminal TA of a user. This terminal may consist of a telephone, a smartphone, a computer or a tablet or a connected object.

Figure 4:
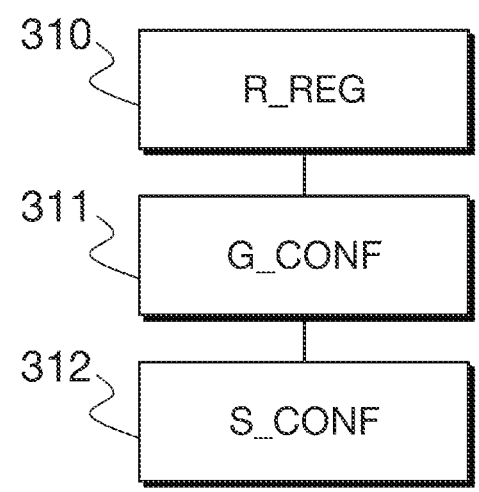
FIG. 4 illustrates the main steps of the method for obtaining a configuration according to one particular embodiment of the invention.

The terminal TA is designed to implement the method for obtaining a configuration described with reference to FIG. 4.

The terminal TA is connected to a home network R_HN. This home network R_HN corresponds to the network of the operator to which the user of the terminal TA has subscribed with his primary subscription (home network).

In this example, this home network R_HN contains three access networks R_ACC1, R_ACC2 and R_ACC3 and a network core R_C that is interconnected only to the two access networks R_ACC2 and R_ACC3.

For example, in this embodiment, the network core R_C is an IMS network core interconnected to 4G (R_ACC2) and Wi-Fi (R_ACC3) access networks, but not to the access network R_ACC1, which is formed in this example by a 2G/3G access network.

Figure 3:
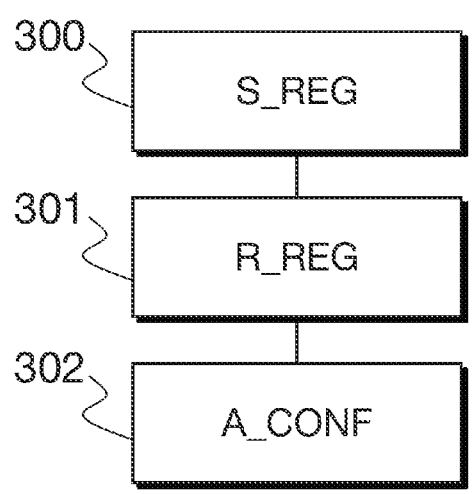
FIG. 3 illustrates the main steps of the configuration method according to one particular embodiment of the invention.

The network core R_C contains a server SRV implementing the configuration method described with reference to FIG. 3, and a database DB in which terminal configuration parameters are stored in association with network access parameters.

The home network R_HN is interconnected to a network R_VN. The network R_VN is the home network of a terminal TB. The terminal TB is a communication terminal such as a telephone, a smartphone, a computer or else a tablet.

By virtue of the interconnection between the network R_HN and the network R_VN, the terminal TA is able to set up communications with the terminal TB.

The networks R_HN and R_VN may be interconnected through a transit network that is not shown.

Before being able to send or receive communications by way of the network R_C, the terminal TA has to perform a registration procedure.

The registration procedure is performed by a terminal when it attaches to an IMS network, and upon each change of access network technology and when renewing registration depending on the "Expires" value returned in the response to the REGISTER. For example, when the terminal accesses the network R_C by way of the access network R_ACC3, the registration procedure is performed. When the terminal TA leaves the Wi-Fi network R_ACC3 to connect to the 4G cellular network R_ACC2, the registration procedure is performed again by the terminal.

From the point of view of the terminal, the registration procedure comprises sending a SIP REGISTER registration message to the network R_C, and receiving a positive or negative response from the network R_C. The messages exchanged for the registration may be greater in number and comprise for example authentication messages.

Figure 2:
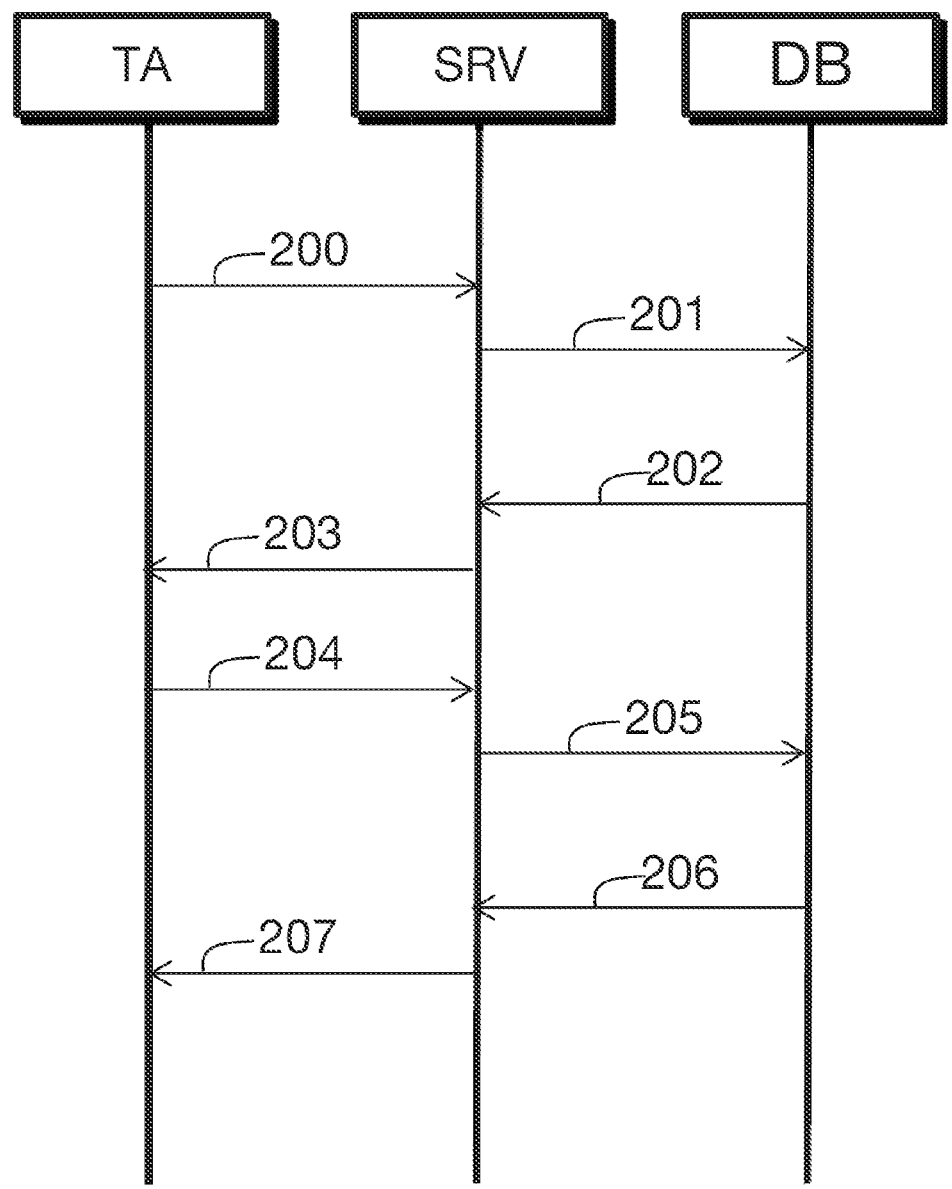
FIG. 2 illustrates, in the form of a timing chart, an exchange of messages for registering a terminal on a communication network.

FIG. 2 illustrates a message exchange allowing the terminal TA to register on the network R_C.

The terminal sends an SIP REGISTER request 200 to the server SRV belonging to the IMS core R_C. The server SRV may correspond to various servers of the network R_C. It may be for example a P-CSCF (or A-SBC), I-CSCF or S-CSCF server, or else an application server or a combination of these. The server SRV receives the request 200 and interrogates a database comprising data relating to the subscribers of the network via a message 201. In the case of an IMS network such as the network R_C, the database is for example an HSS server, and the message 201 may be a SAR message in accordance with the Diameter protocol.

In response, the server SRV obtains the parameters linked to the authentication through the message 202 and returns the SIP code 401 to the terminal in the message 203 containing the authentication parameters and security parameters allowing the subsequent exchanges to be secured.

The terminal TA authenticates the network R_C on the basis of the received authentication parameters, and it then calculates the authentication response before transmitting it, in a second SIP REGISTER message 204, to the server SRV through a secure link the characteristics of which were negotiated during the exchange of the messages 200 and 203. The server SRV compares the authentication result calculated by the terminal for example and for the Wi-Fi or 4G access technology, on the basis of the content of the SIM card, and then authentication parameters provided in the SIP response 401 with the expected result.

If the result of the comparison is positive, then the server SRV registers the terminal in the database DB associated with a "registered" state and with the address of the server SRV taking responsibility for the terminal.

Once registration has been performed on the network, this is renewed at regular intervals on the basis of an expiry value contained in the response to the registration message. However, in the event of changing access technology, for example if the terminal leaves the access network R_ACC2 for the access network R_ACC3, the registration procedure is performed again without taking into account the indicated expiry value.

The SIP REGISTER registration message sent by the terminal TA comprises parameters relating to the access network. Such parameters correspond for example to the content of a PANI (Private-Access Network Identifier) field the content of which is positioned by the terminal.

The PANI field is given a value by the terminal depending on the 2G or 3G or 4G access type and conventionally comprises an information field for GERAN/UTRAN/EUTRAN cellular radio access technology, a field intended to receive a radio cell identifier, and for Wi-Fi access technology, an information field for WiFi IWLAN access technology, a field for filling in the MAC address of the Wi-Fi access point that is used.

The information filled in by the terminal in the PANI field is not certified as it could easily be falsified by the terminal TA (reference is then made to UPLI for user provided location information PANI).

As is known, the network R_C gives a value to a second PANI field when it intercepts a registration message from the terminal TA based on data obtained by interrogating various databases of the network R_C and/or equipments of the access network. For example, the server SRV may consult the PCRF (Policy and Charging Rules Function), the HLR (Home Location Register) or the HSS (Home Service Subscriber) in order to ascertain the access technology and/or the last radio cell used.

Parameters relating to the network access may also be contained in a SIP P-VNI (Private-Visited Network Identifier) field inserted by a server via which the SIP requests sent by the terminal transit.

In spite of the standardization attempts made in IMS communication networks and in particular VoLTE and VoWiFi access, the behavior of the terminal needs to be adjusted depending on the context in which it connects to the network.

For example, if the terminal TA roams in another country, it will have to connect to a visited communication network of an operator with which the operator of the home network R_HN has entered into a roaming agreement. This visited network may not offer the same services as the home network and may implement error processing procedures or pricing policies that are different from the home network.

A particular configuration of the terminal is necessary depending on whether it connects to its home network or to a visited network, and depending on the operator of the visited network.

Non-exhaustively, such a configuration may comprise, depending on a type of visited network and/or a particular mobile operator:

rules for keeping or not keeping the IMS APN (Access Point Name) on a 3G and/or 2G network in the event of moving from the 4G network or from the Wi-Fi network, rules relating to the explicit SIP deregistration or keeping a registration in the IMS network core by the terminal when it changes access network, rules governing the activation or lack of activation of the VxLTE service or of the VxWiFi service, criteria for activating the VxLTE Preconditions mode depending on the version of the telecommunications standards supported by the network, conditions for activating the interface Ut in order to configure additional services (returning calls, secret calling, etc.) or the MMI (Man to Machine Interface) interface, Wi-Fi radio level configuration parameters (Roveln-RoveOut) allowing the use of VxWiFi services in order for example to make it possible to lower the thresholds in the event of problems on cellular networks, in a region or globally, parameters relating to the configuration of the audio and video codecs able to be used depending on the 2G, 3G, 4G or Wi-Fi access type, activation or lack of activation of the various SR-VCC (Single Radio Voice Call Continuity) modes that are supported (SR-VCC, a-SRVCC (Alerting Single Radio Voice Call Continuity), b-SRVCC (Before alerting Single Radio Voice Call Continuity), r-SRVCC (Reverse Single Radio Voice Call Continuity), e-SRVCC (Enhanced Single Radio Voice Call Continuity), etc.), parameters relating to the activation or lack of activation of the DR-VCC (Dual-Radio Voice-Call Continuity) mode, or else rules for processing emergency calls (fallback to 2G/3G, VoLTE, VoWiFi, etc.).

A particular configuration of the terminal is also necessary in order for it to be able to react to problems depending on the VoLTE or VoWiFi access network type. For this purpose, error code management rules are implemented by the terminal. These rules may be different depending on whether the access network is a VoWiFi or VoLTE network for example.

The configuration of the terminal also comprises rules that describe behavior to be adopted in the event of loss of service.

For example, if the VxLTE service offered by the network R_ACC2 is unavailable, various types of behavior may be imposed on the terminal by the operator of the network to which it is attached, including and without limitation:

No particular processing (the service is not provided),

Attempt to automatically fall back to circuit-switched mode CS via the network R_ACC1, if this alternative does not have an additional cost for the client, Attempt to fall back to circuit-switched mode via the network R_ACC1 (2G/3G) "proposed to the user" on the terminal, with the user being asked to validate or cancel if this access mode has an additional cost, Attempt to fall back to VxWiFi.

According to another example, if the VxWiFi service is not available from the network R_ACC3, various behavior of the terminal is possible and may be contained in the configuration, including:

No particular processing (the service is not provided),

Attempt to automatically fall back to circuit-switched mode CS Fallback (2G/3G) if no additional cost for the client Attempt to automatically fall back to circuit-switched mode CS via the network R_ACC1, if this alternative does not have an additional cost for the client, Attempt to fall back to circuit-switched mode via the network R_ACC1 (2G/3G) "proposed to the user" on the terminal, with the user being asked to validate or cancel if this access mode has an additional cost, and if the conditions allow this (4G coverage and sufficient radio level, button of the terminal not positioned on WiFiOnly), Attempt to fall back to VxLTE (4G) "proposed to the user" on the terminal, with the user being asked to validate or cancel and if the conditions allow this (4G coverage and sufficient radio level, button of the terminal positioned on WiFiOnly).

According to another example, if the SMSoIP (Short Message Service over IP) service is unavailable on the network R_ACC2 and a message is not able to be sent using this technology, the following behavior may be described in the configuration:

No particular processing (the service is not provided),

Automatic attempt (if no additional cost for the client) or proposed to the client (if additional cost) to circuit-switched mode via the network R_ACC1, To SMSoSGs mode if 4G coverage and if SMSoSGs mode available (this information is available when the terminal attaches to the network)

Fallback to 2G/3G via R_ACC1 if not possible in SMSoSGS mode or if only under 2G/3G coverage, and then processing of the SMS in conventional 2G/3G mode.

According to a last example, the configuration may make provision for an RCS (Rich Communication Suite) messaging service not to be available and make provision in response for particular behavior of the terminal that may depend on the type of network access. In this case, a particular configuration may provide nothing, the service will not be available, or provide for sending a conventional SMS via the 2G/3G access R_ACC1.

The aim of the invention is to allow automatic configuration of the terminal using configuration parameters such as those presented above, depending on the conditions in which it accesses the network.

For this purpose, it is proposed for the server SRV to transmit configuration rules to the terminal during the procedure of registering the terminal TA in the network core R_C, the configuration rules being selected by the server SRV depending on a parameter relating to the access network, such as for example the content of a PANI field of a SIP REGISTER message. The configuration is transmitted for example in a format in accordance with the XML standard and contained in the "body" section of the 200 OK or error 401 response message. One example of a configuration in the XML format is given in Appendix 1 of the present document.

The configuration method and the method for obtaining a configuration will now be described with reference to FIGS. 3 and 4.

In step 300, the terminal TA sends an initial or subsequent SIP registration message comprising at least one parameter relating to the access network. The registration message is preferably an initial SIP REGISTER message and comprises at least one parameter relating to the access network. The parameter relating to the access network corresponds for example to the content of a PANI field filled in by the terminal or the network and described above. The PANI field may thus be given a value by the terminal depending on the 2G or 3G or 4G access type and/or depending on the GERAN/UTRAN/EUTRAN cellular radio access technology, and contains a field relating to an identifier or a Wi-Fi access point.

In step 310, the server SRV receives a SIP registration message from the terminal TA, the registration message comprising at least one parameter relating to the access network.

The received message comprises at least one parameter relating to the access network, such as for example a PANI field inserted by the terminal in step 300. The message may also contain parameters relating to the access and inserted by intermediate network equipments. For example, the message may contain a PANI or SIP P-VNI field inserted and given a value by a P-CSCF server for example. Such information inserted by the network is certified as it is not able to be falsified by the terminal.

The terminal is able to obtain these parameters in various ways.

For example, if the terminal TA is in an area of cellular coverage, then the terminal is able to compare MNC (Mobile Network Code) and MCC (Mobile Country Code) information transmitted by the cellular network in the broadcast channel of the 2G/3G/4G cellular radio with the MCC and MNC contained in the IMSI parameter of the SIM card of the terminal. The terminal is thus able to determine whether it is situated in the home network or in a visited network.

In a step 311, the server SRV obtains a configuration adapted to the terminal depending on the parameter relating to the access network contained in the received registration message. These configuration data adapted to the access conditions of the terminal TA are obtained for example by an S-CSCF server of the network R_C.

The S-CSCF obtains the configuration parameters adapted to the network access conditions of the terminal that are received in the SIP REGISTER message in step 310. Thus, on the basis of the information contained in the PANI and/or P-VNI field or fields and received in the initial SIP REGISTER message, and on the basis of other parameters specific to the user of the terminal TA and obtained for example from an HSS server, the server SRV determines optimum configuration parameters for the terminal TA. According to one particular embodiment, the determined configuration comprises a parameter relating to a type of coding of multimedia flows that is accepted by the communication network, a criterion for selecting a particular access technology for setting up communications, or else at least one strategy for managing emergency calls.

According to one particular embodiment, configuration parameters are obtained depending on parameters that are preconfigured in an S-CSCF of the network R_C and applicable for all of the clients of the operator.

According to one particular embodiment, the configuration parameters are obtained from an HSS server of the network R_C. An HSS server stores the profile of the users of the network. The information that it contains allows precise adaptation of the configuration to a particular client, for example depending on his subscription type (prepaid/post-paid, etc.), services that he has (VxLTE, VxWiFi, SMSoIP, RCS, etc.), his identified usage. The usage comprises for example the client's communication habits (SMS, telephony, data connection, etc.) and makes it possible, in the event of the terminal TA roaming in a visited network, to select a partner operator whose pricing conditions are the most advantageous for the primary usage of the user. For example, if the information obtained from the HSS indicates that the user of the terminal TA primarily uses SMS communications, and that several partner operators are available to provide roaming in a foreign country, the configuration of the terminal will comprise a rule for selecting the partner operator offering the best pricing conditions for SMS communications.

Of course, the configuration that is obtained may comprise parameters that are shared by all of the clients of an operator and parameters specifically adapted to the profile of the user of the terminal TA.

According to one particular embodiment, the parameters returned to the terminal are obtained and generated by a P-CSCF server of the network R_C via interactions with the PCRF (Policy and Charging Rules Function).

The server SRV transmits a response to the registration message to the terminal in step 312, the message comprising the configuration obtained from the parameter relating to the access network.

From the configuration parameters obtained in step 311, the server SRV generates a configuration file in accordance with the XML standard. One example of such a configuration file is given in Appendix 1.

The configuration given in the Appendix contains parameters relating to the availability of the various VoLTE, ViLTE (Video over Long Term Evolution), VoWiFi, ViWiFi (Video over WiFi), SMSoIP, RCS services of the network R_C.

The configuration contains an XML tag <APN IMS SIP Registration> and <APN IMS SIP DeRegistration> of the registration and deregistration rules depending on the access technology used by the terminal.

The configuration file also contains strategies for falling back to a particular access technology that are given depending on the current access technology. Such strategies are communicated to the terminal through <VoLTE Fallback>, <VoWiFi Fallback> or <SMSoIP Fallback> tags in the appended configuration example.

The generated configuration file also comprises for example indications about the codecs supported by the network depending on the access technology. Such parameters are given in the example in the appended configuration file, in particular in the <2G Audio Cellular Codec>, <3G Audio Cellular Codec>, <4G Audio Cellular Codec> and <Wifi Audio Cellular Codec> tags.

The appended example is not exhaustive and other configuration parameters may be inserted into the configuration.

The configuration is then inserted into a response to the SIP REGISTER message sent to the terminal TA. It may be inserted into the body of a SIP 200 OK response message to the REGISTER or 401.

In step 301, the terminal TA receives a response to the registration message, the response containing at least one configuration associated with at least one parameter relating to the access network.

The message received by the terminal in response to its registration request contains configuration parameters inserted by the server SRV in step 311 and adapted to the conditions in which the terminal connects to the network R_C. In particular, the received configuration depends on the visited country, on the visited network, on the access point that is used, on the access technology that is used, on the location of the terminal, on an identifier of the terminal or on services subscribed to by the user of the terminal.

The configuration is thus received during the registration phase. According to one preferred embodiment, the configuration rules and parameters are received in a 200 OK response message to a previously sent SIP REGISTER request, such as the message 207 shown in FIG. 2. According to one particular embodiment, the configuration is received in a response message 401 to a previously sent SIP REGISTER request, such as for example the message 203 described with reference to FIG. 2. However, when the configuration is transmitted in such a message 401, it is not transmitted securely as the encryption of the exchanges has not yet been negotiated between the terminal TA and the server SRV. According to another particular embodiment, the configuration may also be received in a response to a SIP SUBSCRIBE request, such as for example a SIP SUBSCRIBE request sent by the terminal in order to subscribe to events linked to the registration, such as for example those described in the IETF RFC3680 standard (A Session Initiation Protocol (SIP) Event Package for Registrations).

Lastly, in a step 302, the terminal TA applies the configuration according to the received rules.

The terminal TA takes into account the configuration parameters received upon reception of the 200 OK (REGISTER) and will also have to take into account certain parameters dynamically at its own initiative, for example when it detects a change of cellular access (2G<->3G <->4G<->2G) since, during these changes, there is no sending of a SIP Re-REGISTER message to the network, in accordance with the IR.92, 3GPP 24.229 standardization.

The obtained configuration is stored by the terminal and the configuration rules are applied until the next 200 OK REGISTER containing an XML configuration according to the invention.

The method for obtaining a configuration and the configuration method that are presented afford a technical advantage over the prior art, including:
- improved consideration of the terminals on the market in terms of their diversity, by way of an automatic configuration of parameters that are not available in the current standards but that are highly important for telecoms operators and that are currently preconfigured in the internal software by the terminal manufacturers upon recommendations from the operators,
- reduced power consumption on the terminals by virtue of optimizing the configuration, allowing the terminal to not send certain messages that may prove needless depending on the context, and by the same token, saving on terminal radio resources,
- low consumption of resources on the access and collection links,
- saving of resources on the IMS core,
- simplification of the terminals and therefore a reduction in costs, since it is not necessary for them to implement procedures and protocols for connecting to a dedicated platform (for example of OMA-DM type), which is generally managed and operated by the telecommunications operator,
- improved consideration of the various versions of the telecommunications standards (3GPP, GSMA, ETSi, etc.),
- greater flexibility for the operators with regard to roaming agreements, by virtue of the dynamic management of certain parameters depending on the visited country and visited operator.

Figure 5:
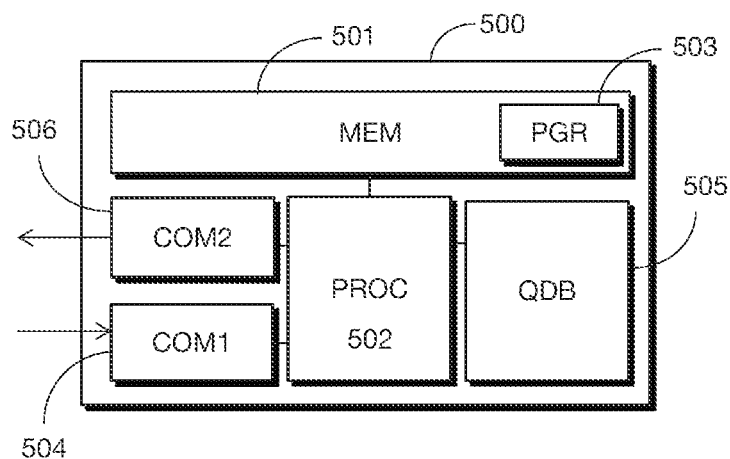
FIG. 5 shows, in one particular embodiment, the architecture of a configuration server according to the invention.

FIG. 5 illustrates the architecture of a device 500 designed to implement the configuration method according to one particular embodiment.

The device comprises a storage space 501, for example a memory MEM, and a processing unit 502 equipped for example with a processor PROC. The processing unit may be driven by a program 503, for example a computer program PGR, implementing the configuration method as described in the present document with reference to FIG. 4, and in particular the steps of receiving a SIP registration message from a terminal, the registration message comprising at least one parameter relating to the access network, of obtaining a configuration from the parameter relating to the access network contained in the received registration message, and of transmitting a response to the registration message to the terminal, the message comprising the configuration obtained from the parameter relating to the access network.

On startup, the instructions of the computer program 503 are for example loaded into a RAM memory (Random Access Memory), before being executed by the processor of the processing unit 502. The processor of the processing unit 502 implements the steps of the configuration method according to the instructions of the computer program 503.

For this purpose, in addition to the memory 501 and the processing unit 502, the device comprises at least one communication interface 504, such as for example an Ethernet network interface designed to receive SIP messages from terminals attached to an Ethernet, Wi-Fi, 2G, 3G or 4G access network. The communication interface 504 is in particular designed to receive a SIP registration message, such as a SIP REGISTER or SIP SUBSCRIBE message comprising at least one parameter relating to the access network, such as for example parameters contained in a SIP PANI or P-VNI field as described in the present document. Such a communication interface may be a network card and be associated with a processor configured by way of instructions so as to decode the received SIP messages and extract information therefrom, such as the content of a PANI or P-VNI field, using SIP protocol logic.

The device also comprises a module 505 for accessing a database, designed to determine and obtain a configuration from the parameter relating to the access network contained in a registration message received by the communication module 504. The module 505 may be implemented by a processor configured by way of appropriate instructions so as to interrogate at least one database on the basis of an SQL, SIP Diameter or other protocol request. For example, the module 505 may interrogate an HSS server or a P-CSCF server or a PCRF server in order to obtain information for determining an optimum configuration for the terminal. According to one particular embodiment, the configuration obtained by the module 505 comprises a parameter relating to a type of coding of multimedia flows that is accepted by the communication network, a criterion for selecting a particular access technology for setting up communications, or else at least one strategy for managing emergency calls or at least one strategy for configuring the SIP stack of the terminal.

The device 500 lastly contains a communication module 506 designed to transmit a response to the registration message to the terminal, the message comprising the configuration parameters determined and obtained by the module 505 from the parameter relating to the access network. The communication modules 504 and 506 may be implemented by one and the same network interface or one and the same communication module designed both to transmit and to receive SIP messages. The module 506 may be implemented by a processor configured by way of appropriate instructions so as to generate a file in accordance with the XML format and containing configuration parameters determined and obtained from the parameter relating to the access network contained in a REGISTER message received by the communication module 504 and insert such a configuration file into a response message to the received REGISTER message, such as for example into a 200 OK or 401 response message. Such a parameter is for example a PANI or P-VNI field.

According to one particular embodiment, the configuration device is integrated into a server, such as a P-CSCF (or A-SBC) server or an application server of an IMS network.

Figure 6:
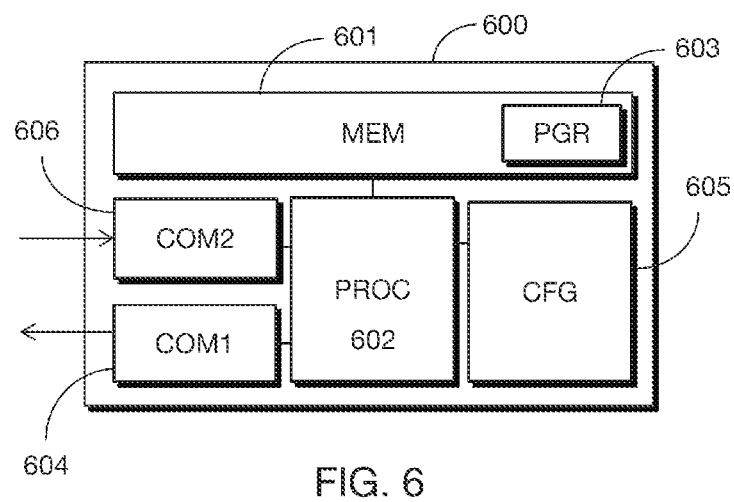
FIG. 6 shows, according to one particular embodiment, the architecture of a device for obtaining a configuration according to the invention.

FIG. 6 illustrates the architecture of a device 600 designed to implement the method for obtaining a configuration according to one particular embodiment.

The device comprises a storage space 601, for example a memory MEM, and a processing unit 602 equipped for example with a processor PROC. The processing unit may be driven by a program 603, for example a computer program PGR, implementing the method for obtaining a configuration as described in the present document with reference to FIG. 3, and in particular the steps of sending a SIP registration message comprising at least one parameter relating to the access network, of receiving a response to the registration message, the response containing at least one configuration associated with the at least one parameter relating to the access network, and of configuring the device according to the received configuration.

On startup, the instructions of the computer program 603 are for example loaded into a RAM memory (Random Access Memory), before being executed by the processor of the processing unit 602. The processor of the processing unit 602 implements the steps of the method for obtaining a configuration according to the instructions of the computer program 603.

For this purpose, in addition to the memory 601 and the processing unit 602, the device 600 comprises at least one communication interface 604, such as for example a 2G, 3G or 4G cellular network interface or a Wi-Fi or Ethernet interface or an ADSL/fiber/cable interface, designed to send SIP messages to a server of an IMS communication network. The communication interface 604 is in particular designed to send a SIP registration message, such as a SIP REGISTER or SIP SUBSCRIBE message, comprising at least one parameter relating to the access network, such as for example parameters contained in a SIP PANI field as described in the present document. Such a communication interface may be a network card and be associated with a processor configured by way of instructions so as to generate messages in accordance with the SIP protocol comprising in particular a PANI field.

The device 600 also contains a communication module 606 designed to receive messages from an IMS communication network by way of a Wi-Fi, 4G or 3G or 2G or ADSL/fiber/cable network, in particular to receive response messages 200 or 401 to a SIP REGISTER request sent by the device. According to one particular embodiment of the invention, such messages comprise at least one configuration parameter of the terminal determined according to at least one network access parameter contained in a registration message sent by the module 604 of the device. One example of a configuration that may be received by the communication module 606 is given in Appendix 1. According to one particular embodiment, the communication module 606 is designed to receive a response message to a SIP registration request, the message comprising a configuration containing a parameter relating to a type of coding of multimedia flows that is accepted by the communication network, a criterion for selecting a particular access technology for setting up communications, a strategy for managing emergency calls, or else a strategy for configuring service continuity procedures in the event of roaming.

The communication modules 604 and 606 may be implemented by one and the same network interface or one and the same communication module designed both to transmit and to receive SIP messages. The module 606 may be implemented by a processor configured by way of appropriate instructions so as to receive data transmitted by a server through a wireless or wired access network and decode the received message in order to extract configuration parameters therefrom.

The device also comprises a module 605 for applying the configuration received by the module 606. Such a module is designed to store the received configuration in a memory of the terminal and apply the rules, strategies and behavior that it contains. The module 605 may be implemented by a processor configured by way of appropriate instructions so as to apply the received configuration parameters. For example, the module 605 may renew the registration of the device using service logic contained in the configuration, prevent the terminal from using certain codecs during call setup phases, or else perform fallbacks on network interfaces of a particular technology in the event of an error.

The device 600 may for example be integrated into a communication terminal such as the terminal TA, a telephone, a smartphone, a tablet, a computer or any other communication terminal.

The invention also relates to a configuration system comprising at least one terminal comprising a device for obtaining a configuration and a server comprising a configuration device.

APPENDIX 1

```
<Device Behavior>
    <Service VoLTE>yes</Service VoLTE>
    <Service ViLTE>no</Service ViLTE>
    <Service VoWiFi>yes</Service VoWiFi>
    <Service ViWiFi>yes</Service ViWiFi>
    <Service SMSoIP>yes</Service SMSoIP>
    <Service RCS>no</Service RCS>
    <APN IMS SIP Registration>
        <Registration 4G>yes</Registration 4G>
        <Registration 3G>yes</Registration 3G>
        <Registration 2G>no</Registration 2G>
        <Registration WiFi>yes</Registration WiFi >
    </APN IMS SIP Registration >
    <APN IMS SIP DeRegistration>
        <SIP DeRegistration Mode>Explicit</ SIP DeRegistration Mode>
        <SIP DeRegistration Time>Before</ SIP DeRegistration Time>
    </APN IMS SIP DeRegistration>
    <VoLTE Fallback>
        < VoLTE Fallback SIP answer>403,408,5xx</VoLTE Fallback SIP answer>
        < VoLTE Fallback to 3G> Automatic </VoLTE Fallback to 3G>
        < VoLTE Fallback to 2G> None </VoLTE Fallback to 2G>
        < VoLTE Fallback to WiFi>Automatic</VoLTE Fallback to WiFi>
    </VoLTE Fallback>
    <VoWiFi Fallback>
        <VoWiFi Fallback SIP answer>408,5xx</ VoWiFi Fallback SIP answer>
        <VoWiFi Fallback to 3G>proposed</ VoWiFi Fallback to 3G>
        <VoWiFi Fallback to 2G>proposed</ VoWiFi Fallback to 2G>
        <VoWiFi Fallback to 4G>proposed</ VoWiFi Fallback to 4G>
    </VoWiFi Fallback>
    <SMSoIP Fallback>
        <SMSoIP Fallback SIP answer>408,5xx</SMSoIP Fallback SIP answer>
        <SMSoIP Fallback to CS SMS 3G>proposed</SMSoIP Fallback to to CS SMS 3G>
        <SMSoIP Fallback to CS SMS 2G>proposed</SMSoIP Fallback to to CS SMS 2G>
        <SMSoIP Fallback to SMSoSGS 4G>proposed</SMSoIP
```

APPENDIX 1-continued

```
Fallback to SMSoSGS 4G>
    </SMSoIP Fallback>
    <MMtel service configuration>CS MMI<MMtel service
    configuration>
    <USSI> No</USSI>
    <2G Audio Cellular Codec> GSM, AMR</2G Audio Cellular
    Codec>
    <3G Audio Cellular Codec> GSM, AMR, WB-AMR
    12,65</3G Audio Cellular Codec>
    <4G Audio Cellular Codec> GSM, AMR, WB-AMR
    12,65</4G Audio Cellular Codec>
    <WiFi Audio Cellular Codec> GSM, AMR, WB-AMR
23,85, EVS</WIfI Audio Cellular Codec>
    <SR-VCC>eSRVCC, aSRVCC</SR-VCC>
    <DR-VCC>No</DR-VCC>
</Device Behavior>
```

Although the present disclosure has been described with reference to one or more examples, workers skilled in the art will recognize that changes may be made in form and detail without departing from the scope of the disclosure and/or the appended claims.

The invention claimed is:

1. A method, to be performed by at least one server of an Internet Protocol (IP) Multimedia Subsystem (IMS) communication network, wherein the method comprises the following acts:
   receiving a Session Initiation Protocol (SIP) registration message from a terminal, the SIP registration message comprising at least one parameter relating to an access network used by the terminal,
   obtaining a configuration from the parameter relating to the access network contained in the received SIP registration message, the configuration comprising at least one parameter relating to one or more fallback strategies for selecting access network of a second type in the event of failure to set up communication on an access network of a first type or a loss of connection; and
   transmitting a response to the SIP registration message to the terminal, the response comprising the configuration obtained from the parameter relating to the access network.

2. The method as claimed in claim 1, wherein the configuration comprises at least one parameter relating to a type of coding of multimedia flows that is accepted by the communication network.

3. The method as claimed in claim 1, wherein the configuration comprises at least one criterion for selecting a particular access technology in order to set up communications.

4. The method as claimed in claim 1, wherein the configuration comprises at least one parameter relating to at least one strategy for managing emergency calls.

5. The method as claimed in claim 1, wherein the configuration comprises at least one parameter relating to at least one strategy for configuring the SIP stack of the terminal.

6. The method as claimed in claim 1, wherein the method is implemented by a server chosen from among the servers from the set consisting of:
   a Proxy Call State Call Control (P-CSCF) server,
   an Interrogating Call State Control Function (I-CSCF) server,
   a Session Call State Control Function (S-CSCF) server,
   an Access Session Border Controller (A-SBC),
   an Application Server (AS), and
   a Home Service Subscriber (HSS) server.

7. The method as claimed in claim 1, wherein the at least one parameter relating to the access network is chosen from the set consisting of:
   a visited country identifier,
   a visited network identifier,
   an identifier of an access point,
   an access technology,
   location information, and
   an identifier of the terminal.

8. A method, to be performed by terminal of an IMS communication network, comprising the following acts:
   sending a SIP registration message comprising at least one parameter relating to an access network used by the terminal,
   receiving a response to the SIP registration message, the response containing at least one configuration associated with the at least one parameter relating to the access network, the configuration comprising at least one parameter relating to one or more fallback strategies for selecting access network of a second type in the event of failure to set up communication on an access network of a first type or a loss of connection and
   configuring the terminal according to the received configuration.

9. The method as claimed in claim 8, wherein the configuration comprises at least one element chosen from among the set consisting of:
   a parameter relating to a type of coding of multimedia flows that is accepted by the communication network,
   a criterion for selecting a particular access technology for setting up communications,
   a strategy for managing emergency calls,
   a strategy for configuring service continuity procedures in the event of roaming, and
   a strategy for configuring the SIP protocol stack of the terminal.

10. The method as claimed in claim 8, wherein the configuration comprises at least one parameter relating to a type of coding of multimedia flows that is accepted by the communication network.

11. The method as claimed in claim 8, wherein the configuration comprises at least one criterion for selecting a first access technology in order to set up communications.

12. The method as claimed in claim 8, wherein the configuration comprises at least one comprises at least one parameter relating to at least one strategy for managing emergency calls.

13. The method as claimed in claim 8, wherein the configuration comprises at least one parameter relating to at least one strategy for configuring the SIP stack of the terminal.

14. The method as claimed in claim 8, wherein the at least one parameter relating to the access network is chosen from the set consisting of:
   a visited country identifier,
   a visited network identifier,
   an identifier of an access point,
   an access technology,
   location information, and
   an identifier of the terminal.

15. A server for configuring a terminal in an IMS communication network, wherein the server comprises:
   a communication interface, configured so as to receive a SIP registration message from a terminal, the SIP registration message comprising at least one parameter relating to the access network,
   a processor; and a non-transitory computer readable medium comprising instructions stored thereon, which when executed by the processor configure the server to:

access a database to obtain a configuration from the parameter relating to the access network contained in the received SIP registration message, the configuration comprising at least one parameter relating to one or more fallback strategies for selecting access network of a second type in the event of failure to set up communication on an access network of a first type or a loss of connection;

transmit, using the communication interface, a response to the SIP registration message to the terminal, the response comprising the configuration obtained from the parameter relating to the access network.

16. The server as claimed in claim 15, wherein the server is chosen from among the servers from the set consisting of:
a Proxy Call State Call Control (P-CSCF) server,
an Interrogating Call State Control Function (I-CSCF) server,
a Session Call State Control Function (S-CSCF) server,
an Access Session Border Controller (A-SBC),
an Application Server (AS), and
a Home Service Subscriber (HSS) server.

17. A device for obtaining a configuration for connecting the device to an IMS communication network, the device comprising:
a communication interface;
a processor; and
a non-transitory computer readable medium comprising instructions stored thereon, which when executed by the processor configure the device to:
transmit, using the communication interface, a SIP registration message to a server of the IMS communication network, the message comprising at least one parameter relating to the access network used by the device,
receive, using the communication interface, a response to the SIP registration message, the response containing at least one configuration associated with the at least one parameter relating to the access network, the configuration comprising at least one parameter relating to one or more fallback strategies for selecting access network of a second type in the event of failure to set up communication on an access network of a first type or a loss of connection; and
configure the device according to the configuration received by the communication interface.

18. The device according to claim 17, wherein the device is implemented in a terminal.

19. A non-transitory computer-readable information medium on which there is recorded a computer program comprising instructions for executing a method for configuring a terminal via a server in an IMS communication network, when the instructions are executed by a processor of the server, wherein the instructions configure the server to perform the following acts:
receiving a SIP registration message from a terminal, the SIP registration message comprising at least one parameter relating to an access network used by the terminal,
obtaining a configuration from the parameter relating to the access network contained in the received SIP registration message, the configuration comprising at least one parameter relating to one or more fallback strategies for selecting access network of a second type in the event of failure to set up communication on an access network of a first type or a loss of connection; and
transmitting a response to the SIP registration message to the terminal, the response comprising the configuration obtained from the parameter relating to the access network.

20. A non-transitory computer-readable information medium on which there is recorded a computer program comprising instructions for executing a method for obtaining a configuration via a terminal in an IMS communication network, when the instructions are executed by a processor of the terminal, wherein the instructions configure the terminal to perform the following acts:
sending a SIP registration message comprising at least one parameter relating to an access network used by the terminal,
receiving a response to the SIP registration message, the response containing at least one configuration associated with the at least one parameter relating to the access network, the configuration comprising at least one parameter relating to one or more fallback strategies for selecting access network of a second type in the event of failure to set up communication on an access network of a first type or a loss of connection; and
configuring the terminal according to the received configuration.

* * * * *